United States Patent
Oertle et al.

(10) Patent No.: US 9,713,000 B2
(45) Date of Patent: Jul. 18, 2017

(54) SYSTEMS AND METHODS FOR PERFORMING OVER-THE-AIR ACTIVATION WHILE ROAMING

(71) Applicant: Omnitracs, LLC, San Diego, CA (US)

(72) Inventors: Kenneth H Oertle, San Diego, CA (US); Michael Anger, San Diego, CA (US); David S Cha, San Diego, CA (US)

(73) Assignee: OMNITRACS, LLC, Dallas, TX (US)

(*) Notice: Subject to any disclaimer, the term of this patent is extended or adjusted under 35 U.S.C. 154(b) by 384 days.

(21) Appl. No.: 13/788,953

(22) Filed: Mar. 7, 2013

(65) Prior Publication Data
US 2013/0237203 A1 Sep. 12, 2013

Related U.S. Application Data

(60) Provisional application No. 61/609,054, filed on Mar. 9, 2012.

(51) Int. Cl.
*H04M 3/00* (2006.01)
*H04W 8/24* (2009.01)
*H04W 8/26* (2009.01)

(52) U.S. Cl.
CPC ............ *H04W 8/245* (2013.01); *H04W 8/265* (2013.01)

(58) Field of Classification Search
CPC ..... H04W 8/245; H04W 8/265; H04W 4/001; H04W 76/02
USPC .......... 455/418, 411, 435 A, 435.1; 713/168, 713/171; 235/472.1
See application file for complete search history.

(56) References Cited

U.S. PATENT DOCUMENTS

| | | | |
|---|---|---|---|
| 6,879,825 B1 | 4/2005 | Daly | |
| 2003/0224823 A1* | 12/2003 | Hurst | G06F 21/10 455/558 |
| 2009/0217038 A1* | 8/2009 | Lehtovirta | H04L 29/12783 713/168 |
| 2010/0210306 A1 | 8/2010 | Larsson | |
| 2011/0119492 A1* | 5/2011 | Palanigounder | H04L 63/0884 713/171 |
| 2011/0225418 A1* | 9/2011 | Shipley | G06F 21/74 713/153 |

(Continued)

FOREIGN PATENT DOCUMENTS

| | | |
|---|---|---|
| WO | 02058361 A2 | 7/2002 |
| WO | 2009073305 A1 | 6/2009 |
| WO | 2010102236 A2 | 9/2010 |

OTHER PUBLICATIONS

International Search Report and Written Opinion—PCT/US2013/029943—ISA/EPO—Jun. 21, 2013.

*Primary Examiner* — Dung Hong
(74) *Attorney, Agent, or Firm* — Arent Fox LLP

(57) ABSTRACT

Methods, systems and devices are provided for over-the-air activation of a mobile device that include provisioning the mobile device with an activation identifier linked to a particular home network, initiating over-the-air activation of the mobile device, forwarding the activation identifier to a network, and replacing the activation identifier with a different and unique identifier linked to the mobile device during over-the-air activation. The over-the-air activation may be performed when the mobile device is within the home network or when the device is outside the home network, and thus "roaming" in another service provider's network.

114 Claims, 6 Drawing Sheets

(56) References Cited

U.S. PATENT DOCUMENTS

2011/0238545 A1* 9/2011 Fanaian ................ G06Q 30/02
 705/34
2014/0106716 A1* 4/2014 LaFreniere ........... H04M 3/382
 455/411

* cited by examiner

# SYSTEMS AND METHODS FOR PERFORMING OVER-THE-AIR ACTIVATION WHILE ROAMING

CROSS-REFERENCE TO RELATED PATENT APPLICATION

This application claims the benefit of priority to U.S. Provisional Patent Application Ser. No. 61/609,054, filed Mar. 9, 2012, the entire contents of which are incorporated herein by reference.

BACKGROUND

Wireless communication technologies have seen explosive growth over the past few years. This growth has been fueled by wireless services providing freedom of movement to the mobile public, and cutting the tether to hardwired communication systems. As a result of service enhancements, the popularity of wireless services is expected to continue to grow rapidly. Part of the growth is due to ease of use and improvements to the user experience of modern cellular services. One option that improves ease of use involves over-the-air activation of new phones and mobile devices.

SUMMARY

The various embodiments provide methods, systems and devices for over-the-air activation of a mobile device that include provisioning the mobile device with an activation identifier linked to a particular home network, initiating over-the-air activation of the mobile device, forwarding the activation identifier to a network, and replacing the activation identifier with a different identifier linked to the particular mobile device during over-the-air activation. The embodiments enable over-the-air activation of new mobile devices even when they are outside the target cellular market, and thus in roaming mode, when the activation is accomplished.

Various embodiments include methods for over-the-air activation of a mobile device that include initiating over-the-air activation of the mobile device with a wireless communication network, including forwarding an activation identifier linked to a particular home network to the wireless communication network, and completing over-the-air activation of the mobile device with a service provider of the particular home network, including replacing the activation identifier with a different identifier linked to the mobile device.

Further embodiments include methods for over-the-air activation of a mobile device that include registering one or more activation identifiers linked to a particular home network with at least one roaming partner network, receiving a request to activate a particular mobile device from a roaming partner network, and replacing the activation identifier with a different identifier linked to the particular mobile device during over-the-air activation of the mobile device.

Further embodiments include methods for over-the-air activation of a mobile device that include receiving a request to initiate over-the-air activation of a mobile device in a wireless communication network, the request including an activation identifier linked to a particular home network, determining the particular home network linked to the received activation identifier, and routing traffic between the mobile device and the particular home network to complete over-the-air activation of the mobile device.

Various embodiments include communication systems, mobile devices and servers including processors configured to perform operations of the embodiment methods disclosed herein. Various embodiments also include communication systems, mobile devices, and servers including means for performing functions of the embodiment methods disclosed herein. Various embodiments also include non-transitory processor- and server-readable storage media having stored thereon processor-executable instructions configured to cause a processor to perform operations of the embodiment methods disclosed herein.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
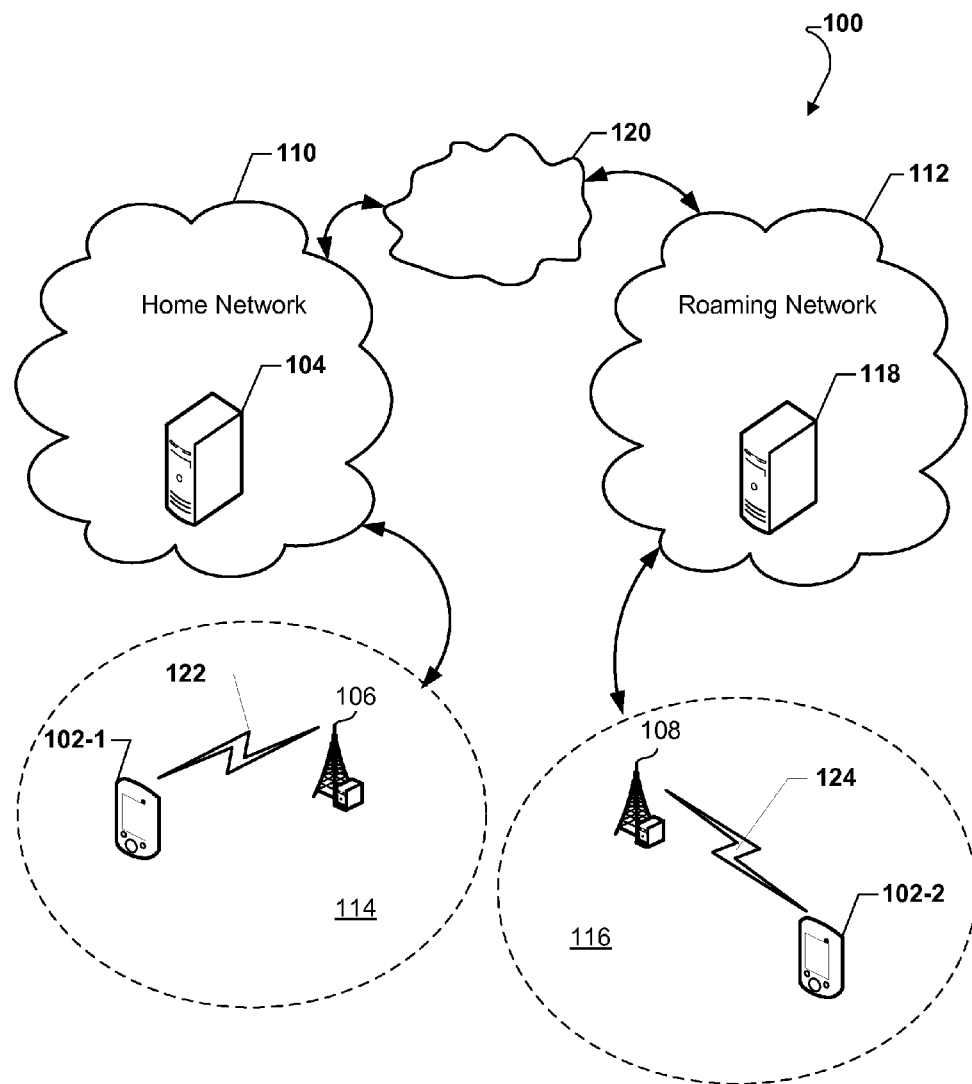
FIG. 1 is a communication system block diagram illustrating a mobile communication system suitable for use in various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The terms "mobile communication device," "mobile device," and "wireless communication device" are used interchangeably herein to refer to any one or all of cellular telephones, smartphones, personal or mobile multi-media players, personal data assistants (PDA's), laptop computers, tablet computers, smartbooks, palm-top computers, wireless electronic mail receivers, multimedia Internet enabled cellular telephones, wireless gaming controllers, and similar personal electronic devices which include a programmable processor and memory and transceiver circuitry for sending and receiving wireless communication signals.

A number of different cellular and mobile communication services and standards are available or contemplated in the future, all of which may implement and benefit from the various embodiments. Various embodiments may utilize a code division multiple access (CDMA)-based technology (e.g., cdmaone, CDMA2000TM), 3rd generation wireless mobile communication technology (3G), 4th generation wireless mobile communication technology (4G), long term evolution (LTE)-based technology, universal mobile telecommunications system (UMTS)-based technology, etc. It will be understood that any references to terminology and/or technical details related to an individual standard or technology are for illustrative purposes only and are not intended to limit the scope of the claims to a particular broadcast communication system or technology unless specifically recited in the claim language.

The various embodiments provide methods, systems and devices for activating a mobile communication device that enables over-the-air activation of the device in both roaming and in non-roaming situations. Embodiments include provisioning the device at the time of manufacture, distribution or sale with an activation identifier linked to a particular home network of a wireless carrier. The activation identifier may be unique to a home network, but may not be unique to the particular device. Thus, the same activation identifier may be provisioned to a plurality of devices registered to or otherwise intended for use on the particular home network, including all devices on the home network. For example, a service provider may have all mobile devices sold for use with its network provisioned with the same identifier. In other embodiments, a plurality of identifiers may be linked to a particular home network and each one of these identifiers may be provisioned in a plurality of mobile devices. In an embodiment, the identifier provisioned according to the embodiment methods is the mobile station identifier, knows as the MSID.

The mobile device may initiate activation of the mobile device for service via the target service provider network (i.e., the service provider associated with the activation identifier). As part of the activation process, the mobile device may forward the activation identifier over an air interface to a communication network. In embodiments, the communication network receiving the activation identifier is configured to recognize the activation identifier as being linked to the target service provider network. The target service provider network may be a different network than the network that initially receives the activation identifier. In other words, the mobile device may be "roaming" outside of the geographic coverage area of its home network, and may instead be within a visited network operated by a different carrier having a pre-existing roaming agreement with the carrier of the target service provider network (e.g., a "roaming partner" of the home network). The roaming partner network, upon recognizing the activation identifier as being linked to a particular target service provider network, may then direct all traffic and requests from the mobile device to the target service provider network. The target service provider network may have agreements with several roaming partner networks in which the partner networks all agree to direct communications to the target service provider network in response to recognizing the target network's activation identifier(s). The target service provider network may be configured to activate the mobile device, which may include replacing the activation identifier with a different identifier which may be unique to the particular mobile device, such as an MSID corresponding to the user's account and unique to the now-activated mobile device.

The various embodiments may be implemented within a variety of wireless communication systems 100, an example of which is illustrated in FIG. 1. The communication system 100 may include a plurality of mobile devices 102-1, 102-2, which may be configured to communicate via a telecommunications network, such as cellular telephone network. Mobile device 102-1 may be configured to receive and transmit voice, data and control signals to and from a base station 106 over an air interface 122. The base station 106 may be coupled to a controller (e.g., cellular base station, radio network controller, service gateway, etc.) operable to communicate the voice, data, and control signals between mobile devices and to other destinations within a first service network 110. The first service network 110 may be operated by a first wireless carrier, and may include a plurality of base stations 106 to provide wireless communication services to a plurality of subscriber devices 102-1 over a first geographic coverage area 114. The first service network 110 may control a number of services for individual subscribers, such as management of subscriber and billing data and selective transmission of data to and from a specific receiver device 102-1. The first service network 110 may be implemented in a single computing device or in many computing devices, either within a single network or across a wide area network, such as the Internet. The first service network 110 may typically include one or more servers 104. The first mobile device 102-1 may be a subscriber device of the first wireless carrier, and the first service network 110 may be the "home network" for the first mobile device 102-1.

FIG. 1 also illustrates a second mobile device 102-2 that is a subscriber device of the first wireless carrier, but is located outside the geographic coverage area 114 of its home network 110 (i.e., the device 102-2 is "roaming"). The second device 102-2 may be the same device as device 102-1 or may be a different device. The second device 102-2 may be in a second geographic coverage area 116 associated with a second service network 112 operated by a different wireless carrier. The second service network 112 may thus be a "visited network" of the second mobile device 102-2. The visited network 112 may be similar to home network 110, and may include a plurality of base stations 108 that may communicate over an air interface 124 with mobile devices within a second geographic coverage area 116. The visited network 112 may be implemented in a single computing device or in many computing devices, either within a single network or across a wide area network, such as the Internet. The visited network 112 may typically include one or more servers 118.

For the purposes of this disclosure, the "first" network 110 may be considered the "target service provider network" or "home network," and the "second" network 112 may be considered the "roaming" network when the mobile device is activated outside of the first network 110.

The first network 110 and the second network 112 may be configured to communicate with one another over another network 120, which may be a wide area network, such as the Internet or a dedicated network used for carrying roaming-related message traffic between the first and second networks. The first network 110 and the second network 112 may have a pre-existing roaming agreement specifying the terms under which a "roaming" device from one network may utilize the services of the other network. For example, a server 118 of the second network 112 may have functionality to determine when a mobile device 102-2 attempting to communicate over network 112 is not a subscriber, and to determine whether the device 102-2 is a subscriber of a particular "roaming partner" network, such as network 110. The second network 112 may contact a server 104 of the device's home network 110 and request service information about the roaming device, such as whether the device 102-2 is allowed to roam. While the mobile device 102-2 is roaming within second network 112, the second network 112 may maintain billing information for usage of the network, such as a Cellular Intercarrier Billing Exchange Record (CIBER), which may be sent to the device's home network 110 for billing purposes.

In order for a mobile device to be activated for first use, the device typically must be provisioned with special data that is unique to the particular cellular system carrier to which the device is a subscriber (referred to herein as the "home network" or the "target service provider network"). Since most cellular providers employ closed systems, in which access to their network is controlled by provisioning data that is tightly controlled by the carriers, most mobile devices must be programmed by a particular carrier before it can be used. Traditionally this was done, for example, at a retail store of the carrier.

Recently, some wireless carriers have begun offering so-called "over-the-air" activation of subscriber mobile devices. In an "over-the-air" activation process, when the device comes up "on-the-air" for the first time (i.e., the device's wireless transceiver is powered on and attempts to establish a wireless link with a base station), the device's target service provider network is configured to recognize the device as a subscriber device that is not yet activated, and to provision the device with the data required to activate the device via the air interface. The "over-the-air" activation process may use, for example, the Open Mobile Alliance-Device Management (OMA-DM) or Over-the-Air Service Provisioning (OTASP) standards, although the embodiments are not limited to any particular over-the-air provisioning protocols.

A drawback to existing techniques for "over-the-air" activation of a mobile device is that the mobile device must be located within its home network (e.g., within coverage area 114 in FIG. 1) in order to accomplish "over-the-air" activation. If a mobile device, such as the device 102-2 illustrated in FIG. 1, attempts to activate while the device is roaming (e.g., within the coverage area 116 of a roaming partner network 112), the attempt will fail. Thus, in order to activate the device, the user generally must either move the device into the carrier's home network or bring the device to the carrier's retail store for activation.

Figure 2:
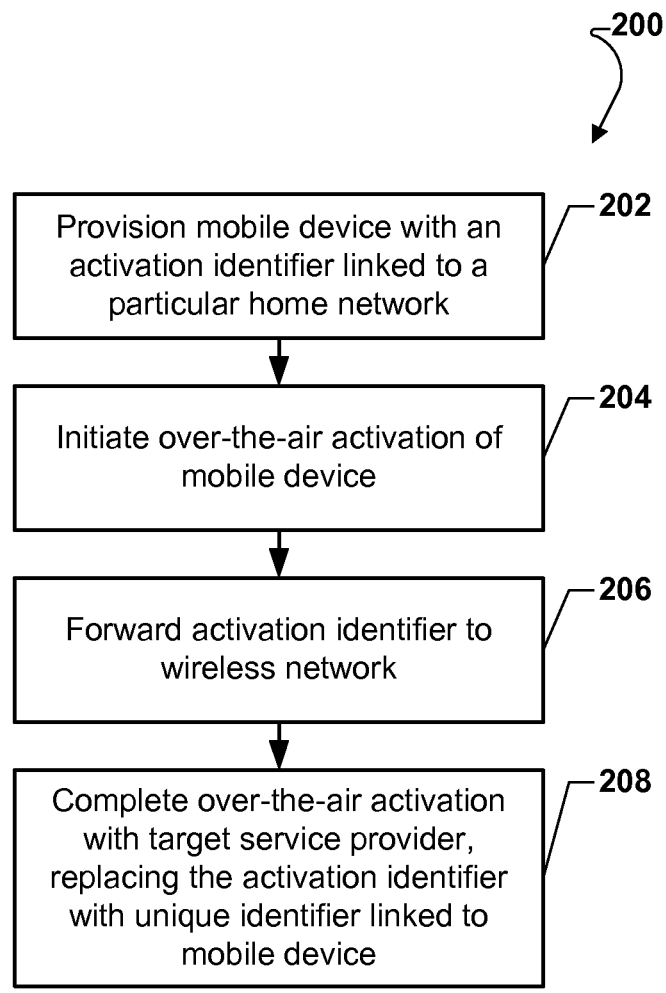
FIG. 2 is a process flow diagram illustrating an embodiment method for over-the-air activation of a mobile device according to one embodiment.

FIG. 2 is a process flow diagram illustrating an embodiment method 200 for over-the-air activation of a mobile communication device 102 using a telecommunication system 100. Various embodiments provide over-the-air activation of a device in either a roaming or a non-roaming environment. In block 202 of method 200, a mobile communication device 102 may be provisioned with an activation identifier linked to a particular home network 110, i.e., the device's target service provider network. The target service provider network 110 is the network with which the device 102 is intended to be subscribed. As discussed above, the mobile device 102 may be provisioned with the activation identifier, for example, at the time of manufacture or prior to sale to the end-user.

In an embodiment, the activation identifier may be a mobile station identifier (MSID) value. Typically, the MSID value is used to identify a particular mobile device to service networks. Prior to activation of the mobile device, however, the MSID is conventionally a placeholder or "dummy" value that is not meaningful and which is replaced with a unique MSID value during the activation process. In various embodiments, prior to activation the device 102 may be provisioned with a valid temporary MSID value that is linked to a particular target service provider network 110.

In various embodiments, the identifier, such as an MSID value, may be unique to a home network, but may not be unique to the particular device. Thus, the same identifier may be provisioned to a plurality of devices registered to or otherwise intended for use on the particular home network, including all devices on the home network. In other embodiments, a plurality of identifiers may be linked to a particular home network and each one of these identifiers may be provisioned in a plurality of mobile devices.

In block 204 of method 200, the mobile device 102 may initiate "over-the-air" activation of the mobile device. This may include, for example, turning on the mobile device 102 for the first time such that the device's transceiver establishes a wireless link with a base station 106 or 108.

In block 206, as part of the normal process of establishing a communication link with the base station, the mobile device 102 may forward the activation identifier, such as an MSID value, to the network 110 or 112 to which the mobile device 102 is connected. When the device 102-1 is within the coverage area 114 of its home network 110, the network 110 may route communications from the mobile device 102-1 to an activation server 104 of the home network 110. The activation server 104 may be configured to determine whether the mobile device 102-1 is a valid subscriber of the home network 110, and if so, to complete the over-the-air activation of the device 102-1 using an activation protocol, such as OMA-DM or OTASP. The activation server 104 may recognize the device 102-1 as a valid subscriber based on the received activation identifier (e.g., an MSID value), which may be associated with the home network 110, and/or based on other information that may be transmitted by the mobile device 102-1. In some embodiments, the mobile device 102 may forward a second identifier that is unique to the mobile device 102, such as a Mobile Equipment Identifier (MEID) value. The activation server 104 may recognize this second identifier as associated with a valid subscriber device, and may then complete the activation of the mobile device 102-1.

In the various embodiments, when the mobile device 102-2 is outside the home network and within the coverage area 116 of a visited network 112 (i.e., the device 102-2 is in a roaming situation), the visited network 112 may route communications from the mobile device 102-2 to an authentication, authorization and accounting (AAA) server 118 of the visited network 112. The AAA server 118 may be configured to recognize the activation identifier provided by the device 102-2, such as an MSID value, as being associated with a particular home network, such as the target service provider network 110. In embodiments, the AAA server 118 may access a stored listing of activation identifier(s) linked to particular networks, which may be roaming partner networks. When the AAA server 118 determines the home network 110 associated with the received identifier, the AAA server 118 may then route all traffic and requests from the roaming mobile device 102-2 to the device's home network 110, where a connection may be made with the activation server 104. The home network 110 may then complete the activation process as described above by routing data to and from the mobile device 102-2 through the visited network 112.

In block 208 of embodiment method 200, the over-the-air activation may be completed by replacing the activation identifier in the mobile device 102 with a different identifier that is unique to the particular mobile device 102. The identifier may be replaced during the "over-the-air" activation of the mobile device 102 by the activation server 104 of the home network 110. In one embodiment, the initial identifier is a valid, temporary MSID value, linked to the home network 110, and during activation of the mobile device 102 this temporary value is replaced with a second valid MSID value that is linked to the mobile device 102.

Figure 3:
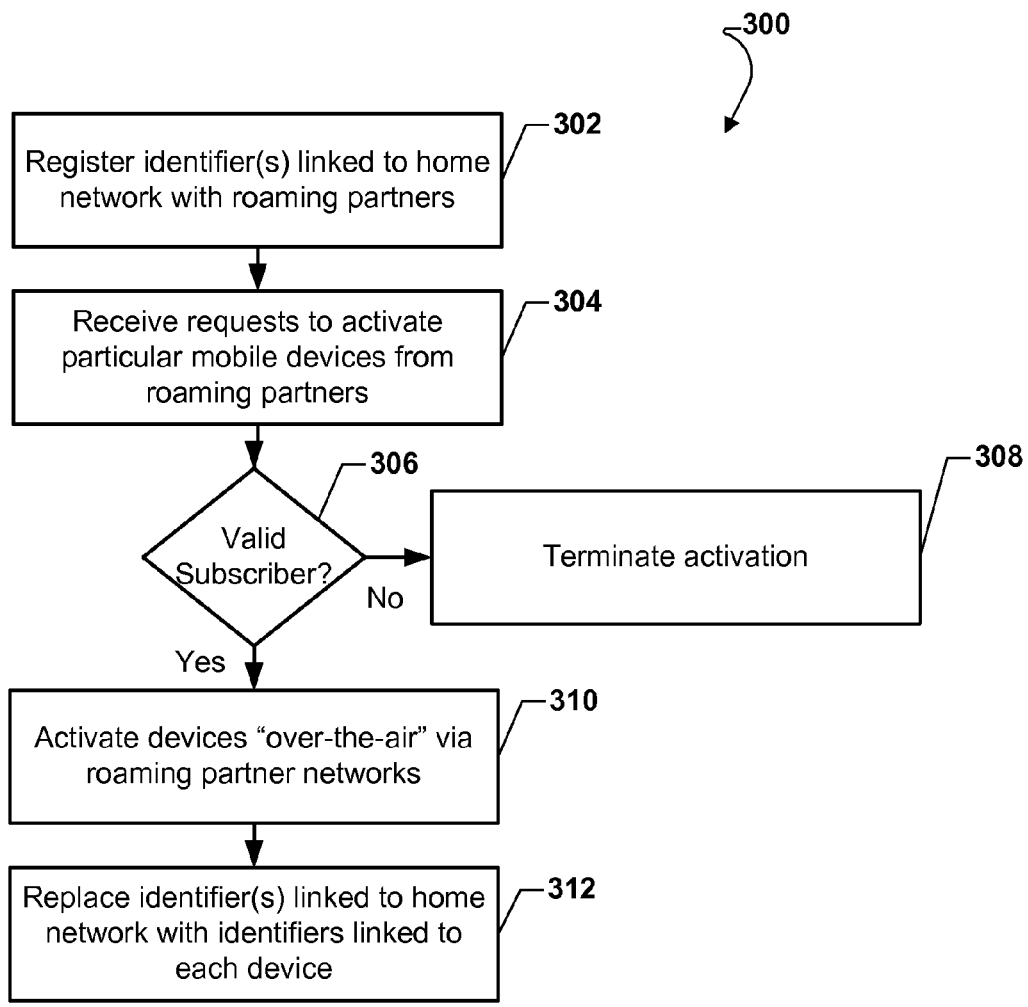
FIG. 3 is a process flow diagram illustrating an embodiment method of over-the-air activation of roaming devices by a home network.

FIG. 3 is a process flow diagram illustrating an embodiment method 300 for over-the-air activation of mobile device(s) 102 that may be implemented in an activation server 104 of a home network 110. In block 302 of method 300, the home network 110 may register one or more identifiers linked to the home network with its roaming partner networks, such as network 112. The registration may be performed by a server 104 of the home network 110, which may communicate with a server 118 of a partner network 112 over a network 120, or in formal partnering agreements. In block 304, the home network 110, and in particular an activation server 104 of the home network 110, may receive requests to activate a mobile device 102 from a roaming partner network 112. The activation server 104 of the home network 110 may determine whether the particular mobile device is a valid subscriber of the home network 110. If a particular mobile device is not a valid subscriber device (i.e., determination block 306="No"), the activation server 104 may deny the request to activate the device and terminate the activation process in block 308. If the mobile device is a valid subscriber device (i.e., determination block 306="Yes"), the activation server 104 may activate the device over-the-air via the roaming partner network 112 at block 310. During or upon activation of the mobile device, the activation server 104 of home network 110 may replace the activation identifier(s) linked to the home network with a different identifier that is unique to the particular device in block 312, such as a unique MSID. The replacement of the activation identifier may also be performed over-the-air via the roaming partner network 112.

Figure 4:
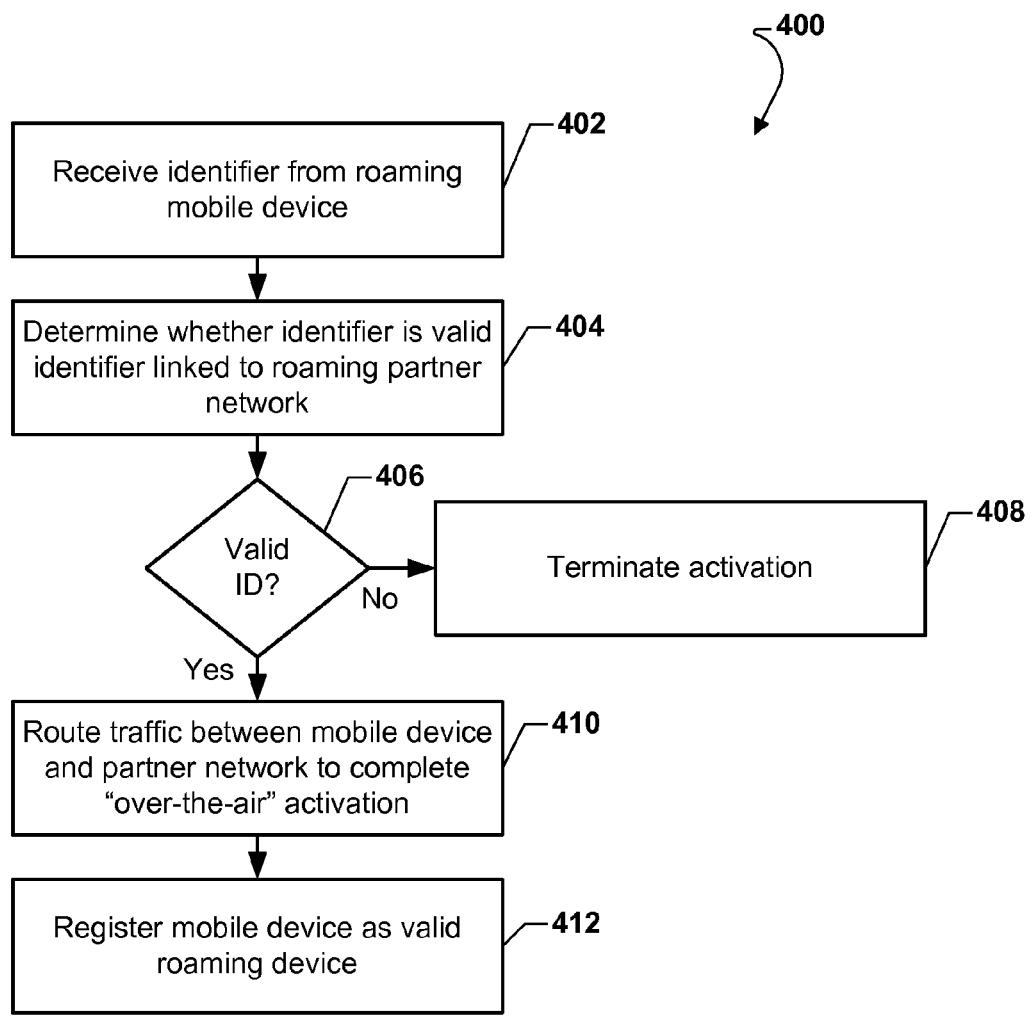
FIG. 4 is a process flow diagram illustrating an embodiment method of over-the-air activation of roaming devices by a visited network.

FIG. 4 is a process flow diagram illustrating an embodiment method 400 for over-the-air activation of a roaming mobile device(s) 102 by a visited network 112. In block 402 of method 400, the visited network 112, and in particular an AAA server 118 of the visited network 112, may receive an identifier from a mobile device 102 that is roaming on the visited network 112. In block 404, the AAA server 118 of the visited network 112 may determine whether the received identifier is a valid activation identifier linked to a particular roaming partner network. For example, the AAA server 118 may compare the received identifier to a list of valid activation identifiers corresponding to the roaming partner network(s) of the visited network 112, which may be stored in a database accessible by the server 118. If the received identifier is not a valid activation identifier that is associated with a particular roaming partner network (i.e., determination block 406="No"), the AAA server 118 of the visited network 112 may terminate the activation in block 408. If the received identifier is a valid activation identifier that is associated with a particular roaming partner network (i.e., determination block 406="Yes"), the AAA server 118 may route traffic between the mobile device 102 and the corresponding partner network associated with the received activation identifier (e.g., home network 110) to complete over-the-air activation of the mobile device 102. Once the device 102 has been activated, the visited network 112 may register the mobile device as a valid roaming device in block 412, and begin providing communication services in accordance with roaming agreements with the home network.

Figure 5:
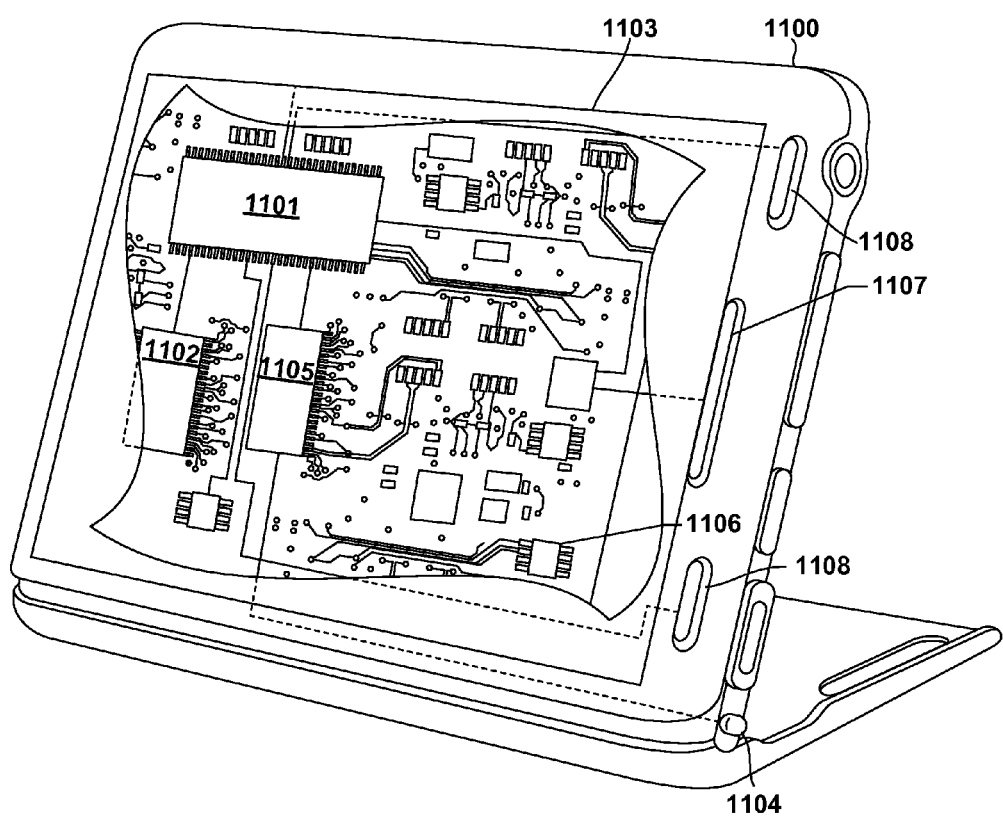
FIG. 5 is a system block diagram of a receiver device suitable for use with any of the embodiments.

FIG. 5 is a system block diagram of a mobile communication device suitable for use with any of the embodiments. A typical mobile communication device 1100 may include a processor 1101 coupled to internal memory 1102, to a display 1103, and to a speaker 1108. Additionally, the mobile communication device 1100 may include an antenna 1104 for sending and receiving electromagnetic radiation that may be connected to a wireless data link and/or cellular telephone transceiver 1105 coupled to the processor 1101 and a mobile multimedia broadcast receiver 1106 coupled to the processor 1101. Mobile communication devices 1100 typically also include menu selection buttons 1107 or rocker switches for receiving user inputs.

Figure 6:
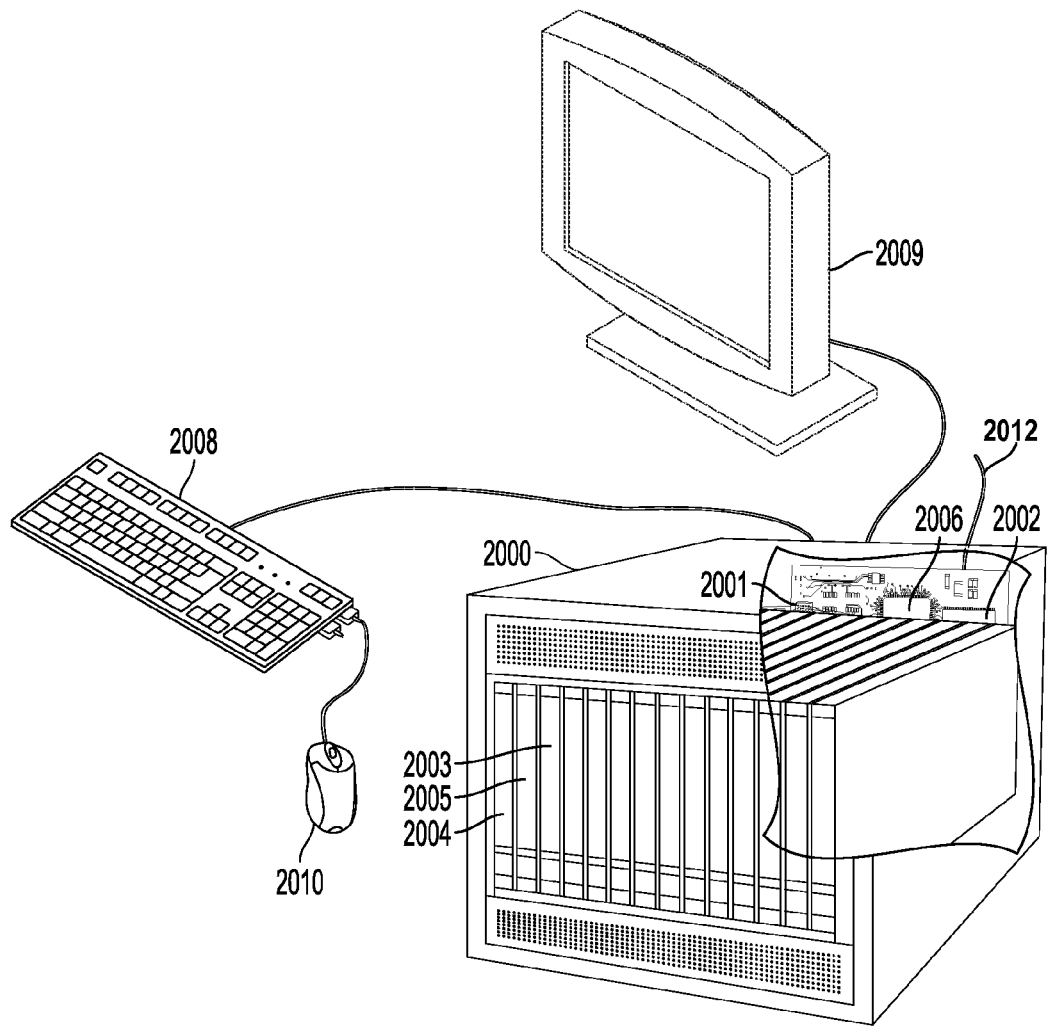
FIG. 6 is a system block of a server suitable for use with any of the embodiments.

The various embodiments may be implemented on the service provider network side on any of a variety of commercially available server devices, such as the server 2000 illustrated in FIG. 6. Such a server 2000 typically includes a processor 2001 coupled to volatile memory 2002 and a large capacity nonvolatile memory, such as a disk drive 2003. The server 2000 may also include a floppy disc drive, compact disc (CD) or DVD disc drive 2004 coupled to the processor 2001. The server 2000 may also include network access ports 2006 coupled to the processor 2001 for establishing data connections with a network 2012, such as a local area network coupled to other broadcast system computers and servers. Servers 2000 may also include operator interfaces, such as a keyboard 2008, pointer device (e.g., a computer mouse 2010), and a display 2009.

The processors 1101, 2001 may be any programmable microprocessor, microcomputer or multiple processor chip or chips that can be configured by software instructions (applications) to perform a variety of functions, including the functions of the various embodiments described below. In some mobile receiver devices, multiple processors 2001 may be provided, such as one processor dedicated to wireless communication functions and one processor dedicated to running other applications. Typically, software applications may be stored in the internal memory 1102, 2002, 2003 before they are accessed and loaded into the processor 1101, 2001. The processor 1101, 2001 may include internal memory sufficient to store the application software instructions.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

When implemented in software, the functions may be stored as one or more instructions or code on a non-transitory computer-readable or processor-readable storage medium. The steps of a method or algorithm disclosed herein may be embodied in a server-executable instructions or processor-executable instructions which may be in the form of software modules that may reside on a non-transitory computer-readable, server-readable or processor-readable storage medium. A non-transitory computer-readable or processor-readable media includes both computer storage media and tangible storage media that facilitate transfer of a computer program from one place to another. A non-transitory computer-readable storage medium may be any available media that may be accessed by a computer. By way of example, and not limitation, such non-transitory storage media may include RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, includes compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

When implemented in hardware, the functionality may be implemented within circuitry of a wireless signal processing circuit that may be suitable for use in a wireless receiver or mobile device. Such a wireless signal processing circuit may include circuits for accomplishing the signal measuring and calculating steps described in the various embodiments.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

Any reference to claim elements in the singular, for example, using the articles "a," "an" or "the" is not to be construed as limiting the element to the singular.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for over-the-air activation of a mobile device, comprising:
   receiving an activation identifier linked to a particular home network and a second identifier linked with the mobile device in a wireless communication network in response to an initiation of over-the-air activation of the mobile device with the wireless communication network, wherein the mobile device is one of a plurality of mobile devices registered to the particular home network, and wherein the plurality of mobile devices are provisioned with the activation identifier linked to the particular home network;
   determining that the mobile device is a valid subscriber device based on the activation identifier and the second identifier; and
   replacing the activation identifier with a different identifier linked to the mobile device during over-the-air activation in response to determining that the mobile device is a valid subscriber device, wherein the over-the-air activation is performed using an Open Mobile Alliance —Device Management (OMA-DM) standard, and wherein the wireless communication network maintains a Cellular Intercarrier Billing Exchange Record (CIBER) corresponding to billing information for usage of the wireless communication network by the mobile device.

2. The method of claim 1, wherein when the wireless communication network is not the home network of the mobile device, further comprising:
   determining the particular home network linked to the activation identifier; and
   routing traffic between the mobile device and the particular home network via the wireless communication network to enable the particular home network to complete the over-the-air activation.

3. The method of claim 1, further comprising:
   registering one or more activation identifiers linked to a particular home network with at least one roaming partner network.

4. The method of claim 1, further comprising registering the activation identifier linked to the particular home network with at least one roaming partner network.

5. The method of claim 4,
wherein a first plurality of mobile devices is provisioned with a first activation identifier linked to the home network and
a second plurality of mobile devices is provisioned with a second activation identifier linked to the home network; and
registering the first activation identifier and the second activation identifier with at least one roaming partner network.

6. The method of claim 1, wherein the activation identifier linked to the home network comprises a mobile station identifier (MSID) value linked to the home network.

7. The method of claim 1, wherein initiating over-the-air activation receiving the activation identifier further includes receiving a mobile equipment identifier (MEID) value to the wireless communication network.

8. The method of claim 1, wherein the over-the-air activation is performed using the OMA-DM standard and Over-the-Air Service Provisioning (OTASP) standard.

9. The method of claim 1, wherein the mobile device communicates with the wireless communication network using a CDMA-based technology.

10. A method for over-the-air activation of a mobile device, comprising:
initiating over-the-air activation of the mobile device with a wireless communication network, including forwarding an activation identifier linked to a particular home network and a second identifier linked to the mobile device to the wireless communication network, wherein the mobile device is one of a plurality of mobile devices registered to the particular home network, and wherein the plurality of mobile devices are provisioned with the activation identifier linked to the particular home network; and
completing over-the-air activation of the mobile device with a service provider of the particular home network, including replacing the activation identifier with a different identifier linked to the mobile device, wherein the over-the-air activation is completed in response to determining that the mobile device is a valid subscriber device based on the activation identifier and the second identifier, and wherein the over-the-air activation is performed using an Open Mobile Alliance —Device Management (OMA-DM) standard, and wherein the wireless communication network maintains a Cellular Intercarrier Billing Exchange Record (CIBER) corresponding to billing information for usage of the wireless communication network by the mobile device.

11. The method of claim 10, wherein the wireless communication network is not the home network of the mobile device.

12. The method of claim 10, wherein the activation identifier linked to the home network comprises a mobile station identifier (MSID) value linked to the home network.

13. The method of claim 10, wherein the second identifier comprises a mobile equipment identifier (MEID) value linked to the mobile device.

14. The method of claim 10, wherein the over-the-air activation is performed using the OMA-DM standard and Over-the-Air Service Provisioning (OTASP) standard.

15. The method of claim 10, wherein the mobile device communicates with the wireless communication network using a CDMA-based technology.

16. A method for over-the-air activation of a mobile device, comprising:
registering one or more activation identifiers linked to a particular home network with at least one roaming partner network;
receiving a request to activate a particular mobile device from a roaming partner networks and a second identifier linked to the particular mobile device; and
replacing an activation identifier with a different identifier linked to the particular mobile device during over-the-air activation of the mobile device, wherein over-the-air activation is completed in response to determining that the mobile device is a valid subscriber device based on the activation identifier and the second identifier, wherein the mobile device is one of a plurality of mobile devices registered to the particular home network, and wherein the plurality of mobile devices are provisioned with the activation identifier linked to the particular home network, and wherein the over-the-air activation is performed using an Open Mobile Alliance —Device Management (OMA-DM) standard, and wherein the roaming partner network maintains a Cellular Intercarrier Billing Exchange Record (CIBER) corresponding to billing information for usage of the roaming partner network by the mobile device.

17. The method of claim 16,
wherein the mobile device is provisioned with an activation identifier linked to the particular home network prior to receiving the request to activate the mobile device.

18. The method of claim 16, further comprising:
performing over-the-air activation of the mobile device via the roaming partner network.

19. The method of claim 16, further comprising registering the activation identifier linked to the particular home network with at least one roaming partner network.

20. The method of claim 19, wherein a first plurality of mobile devices is provisioned with a first activation identifier linked to the home network and
a second plurality of mobile devices is provisioned with a second activation identifier linked to the home network; and
registering the first activation identifier and the second activation identifier with at least one roaming partner network.

21. The method of claim 16, wherein the activation identifier linked to the home network comprises a mobile station identifier (MSID) value linked to the home network.

22. The method of claim 16, wherein the second identifier comprises a mobile equipment identifier (MEID) value linked to the particular mobile device.

23. The method of claim 16, wherein the over-the-air activation is performed using the OMA-DM standard and Over-the-Air Service Provisioning (OTASP) standard.

24. A method for over-the-air activation of a mobile device, comprising:
receiving a request to initiate over-the-air activation of a mobile device in a wireless communication network, the request including an activation identifier linked to a particular home network, wherein the mobile device is one of a plurality of mobile devices registered to the particular home network, and wherein the plurality of mobile devices are provisioned with the activation identifier linked to the particular home network;
determining the particular home network linked to the activation identifier; and
routing traffic between the mobile device and the particular home network to complete over-the-air activation of the mobile device, wherein routing traffic between the mobile device and the particular home network includes forwarding a second identifier linked to the mobile device to the particular home network, and wherein the over-the-air activation is completed in response to determining that the mobile device is a valid subscriber device based on the activation identifier and the second identifier, and wherein the over-the-air activation is performed using an Open Mobile Alliance —Device Management (OMA-DM) standard, and wherein the wireless communication network maintains a Cellular Intercarrier Billing Exchange Record (CIBER) corresponding to billing information for usage of the wireless communication network by the mobile device.

25. The method of claim 24, wherein the over-the-air activation of the mobile device includes replacing the activation identifier with a unique identifier linked to the mobile device.

26. The method of claim 24, further comprising:
registering the activated mobile device as a valid roaming device.

27. The method of claim 24, further comprising:
receiving data registering the activation identifier as being linked to the particular home network prior to receiving the request to initiate over-the-air activation.

28. The method of claim 24, wherein the second identifier comprises a mobile equipment identifier (MEID) value linked to the mobile device.

29. The method of claim 24, wherein the activation identifier linked to the home network comprises a mobile station identifier (MSID) value linked to the home network.

30. The method of claim 24, wherein the over-the-air activation is performed using the OMA-DM standard and Over-the-Air Service Provisioning (OTASP) standard.

31. The method of claim 24, wherein the mobile device communicates with the wireless communication network using a CDMA-based technology.

32. A communication system, comprising:
a first cellular telephone network comprising a first server configured to perform over-the-air activations of mobile devices and configured with server-executable instructions to perform operations comprising:
provisioning a mobile device with an activation identifier linked to the first cellular telephone network, wherein the mobile device is one of a plurality of mobile devices registered to the first cellular telephone network;
provisioning the plurality of mobile devices with the activation identifier linked to the first cellular telephone network; and
replacing the activation identifier with a different identifier linked to the mobile device during over-the-air activation of the mobile device, wherein the over-the-air activation is completed in response to determining that the mobile device is a valid subscriber device based on the activation identifier and a second identifier, and wherein the over-the-air activation is performed using an Open Mobile Alliance —Device Management (OMA-DM) standard;
a second cellular telephone network comprising a second server configured with server-executable instructions to perform operations comprising:
receiving the activation identifier and a second identifier in the second cellular telephone network, wherein the second identifier is linked with the mobile device;
determining the first cellular telephone network linked to the activation identifier; and
routing traffic between the mobile device and the first cellular telephone network to complete over-the-air activation; and
a mobile device comprising:
a cellular communication transceiver configured to establish cellular telephone communications with either of the first and second cellular telephone networks;
a memory having stored thereon an activation identifier; and
a processor coupled to the cellular communication transceiver and the memory, wherein the processor is configured with processor-executable instructions to perform operations comprising:
initiating over-the-air activation of the mobile device with the first cellular telephone network, including forwarding the activation identifier to the second cellular telephone network, and wherein the second cellular network maintains a Cellular Intercarrier Billing Exchange Record (CIBER) corresponding to billing information for usage of the second cellular network by the mobile device.

33. The communication system of claim 32, wherein the first server is configured with server-executable instructions to perform operations further comprising:
registering one or more activation identifiers linked to the first cellular telephone network with at least one roaming partner network, including the second cellular telephone network.

34. The communication system of claim 32, wherein the first server is configured with server-executable instructions to perform operations further comprising:
registering the activation identifier linked to the first cellular telephone network with at least one roaming partner network, including the second cellular telephone network.

35. The communication system of claim 34, wherein the first server is configured with server-executable instructions to perform operations further comprising:
provisioning a first plurality of mobile devices with a first activation identifier linked to the first cellular telephone network;
provisioning a second plurality of mobile devices with a second activation identifier linked to the first cellular telephone network; and
registering the first activation identifier and the second activation identifier with at least one roaming partner network, including the second cellular telephone network.

36. The communication system of claim 32, wherein the activation identifier linked to the first cellular telephone network comprises a mobile station identifier (MSID) value linked to the first cellular telephone network.

37. The communication system of claim 32, wherein the processor of the mobile device is configured with processor-executable instructions to perform operations such that initiating over-the-air activation further includes forwarding a mobile equipment identifier (MEID) value to the second cellular telephone network.

38. The communication system of claim 32, wherein the over-the-air activation is performed using the OMA-DM standard and Over-the-Air Service Provisioning (OTASP) standard.

39. The communication system of claim 32, wherein the processor of the mobile device is configured with processor-executable instructions to perform operations such that the mobile device communicates with the second cellular telephone network using a CDMA-based technology.

40. A mobile device, comprising:
a transceiver configured to establish wireless communications with a wireless communication network;
a memory having stored thereon an activation identifier; and
a processor coupled to the transceiver and the memory, wherein the processor is configured with processor-executable instructions to perform operations comprising:
initiating over-the-air activation of the mobile device with the wireless communication network, including forwarding an activation identifier linked to a particular home network and a second identifier linked to the mobile device to the wireless communication network, wherein the mobile device is one of a plurality of mobile devices registered to the particular home network, and wherein the plurality of mobile devices are provisioned with the activation identifier linked to the particular home network; and
completing over-the-air activation of the mobile device with a service provider of the particular home network, including replacing the activation identifier with a different identifier linked to the mobile device, wherein the over-the-air activation is completed in response to determining that the mobile device is a valid subscriber device based on the activation identifier and the second identifier, and wherein the over-the-air activation is performed using an Open Mobile Alliance —Device Management (OMA-DM) standard, and wherein the wireless communication network maintains a Cellular Intercarrier Billing Exchange Record (CIBER) corresponding to billing information for usage of the wireless communication network by the mobile device.

41. The mobile device of claim 40, wherein the wireless communication network is not the home network of the mobile device.

42. The mobile device of claim 40, wherein the activation identifier linked to the particular home network comprises a mobile station identifier (MSID) value linked to the home network.

43. The mobile device of claim 40, wherein the second identifier comprises a mobile equipment identifier (MEID) value linked to the mobile device.

44. The mobile device of claim 40, wherein the processor is configured with processor-executable instructions such that the over-the-air activation is performed using the OMA-DM standard and Over-the-Air Service Provisioning (OTASP) standard.

45. The mobile device of claim 40, wherein the processor is configured with processor-executable instructions to perform operations such that the mobile device communicates with the wireless communication network using a CDMA-based technology.

46. A server configured to perform over-the-air activations of mobile devices and configured with server-executable instructions to perform operations comprising:
registering one or more activation identifiers linked to a particular home network with at least one roaming partner network;
receiving a request to activate a particular mobile device from a roaming partner network and a second identifier linked to the particular mobile device; and
replacing an activation identifier with a different identifier linked to the particular mobile device during over-the-air activation of the particular mobile device, wherein over-the-air activation is completed in response to determining that the mobile device is a valid subscriber device based on the activation identifier and the second identifier, wherein the mobile device is one of a plurality of mobile devices registered to the particular home network, and wherein the plurality of mobile devices are provisioned with the activation identifier linked to the particular home network, and wherein the over-the-air activation is performed using an Open Mobile Alliance —Device Management (OMA-DM) standard, and wherein the roaming partner network maintains a Cellular Intercarrier Billing Exchange Record (CIBER) corresponding to billing information for usage of the roaming partner network by the mobile device.

47. The server of claim 46, wherein the particular mobile device is provisioned with the activation identifier linked to the particular home network prior to receiving the request to activate the particular mobile device.

48. The server of claim 46, wherein the server is configured with server-executable instructions to perform operations further comprising:
performing over-the-air activation of the particular mobile device via the roaming partner network.

49. The server of claim 46, further comprising registering the activation identifier linked to the particular home network with at least one roaming partner network.

50. The server of claim 49, wherein
a first plurality of mobile devices is provisioned with a first activation identifier linked to the home network and
a second plurality of mobile devices is provisioned with a second activation identifier linked to the home network; and
registering the first activation identifier and the second activation identifier with at least one roaming partner network.

51. The server of claim 46, wherein the activation identifier linked to the home network comprises a mobile station identifier (MSID) value linked to the home network.

52. The server of claim 46, wherein the second identifier comprises a mobile equipment identifier (MEID) value linked to the particular mobile device.

53. The server of claim 46, wherein the server is configured with server-executable instructions to perform operations such that over-the-air activation is performed using the OMA-DM standard and Over-the-Air Service Provisioning (OTASP) standard.

54. A server configured to perform over-the-air activation of a mobile device and configured with server-executable instructions to perform operations comprising:
receiving a request to initiate over-the-air activation of a mobile device in a wireless communication network, the request including an activation identifier linked to a particular home network, wherein the mobile device is one of a plurality of mobile devices registered to the particular home network, and wherein the plurality of mobile devices are provisioned with the activation identifier linked to the particular home network;
determining the particular home network linked to the activation identifier; and
routing traffic between the mobile device and the particular home network to complete over-the-air activation of the mobile device, wherein routing traffic between the mobile device and the particular home network includes forwarding a second identifier linked to the mobile device to the particular home network, and wherein the over-the-air activation is completed in response to determining that the mobile device is a valid subscriber device based on the activation identifier and the second identifier, and wherein the over-the-air activation is performed using an Open Mobile Alliance —Device Management (OMA-DM) standard, and wherein the wireless communication network maintains a. Cellular Intercarrier Billing Exchange Record (CIBER) corresponding to billing information for usage of the wireless communication network by the mobile device.

55. The server of claim 54, wherein the over-the-air activation of the mobile device includes replacing the activation identifier with a unique identifier linked to the mobile device.

56. The server of claim 54, wherein the server is configured with server-executable instructions to perform operations further comprising:
registering the activated mobile device as a valid roaming device.

57. The server of claim 54, wherein the server is configured with server-executable instructions to perform operations further comprising:
receiving data registering the activation identifier as being linked to the particular home network prior to receiving the request to initiate over-the-air activation.

58. The server of claim 54, wherein the second identifier comprises a mobile equipment identifier (MEID) value linked to the mobile device.

59. The server of claim 54, wherein the activation identifier linked to the home network comprises a mobile station identifier (MSID) value linked to the home network.

60. The server of claim 54, wherein the over-the-air activation is performed using the OMA-DM standard and Over-the-Air Service Provisioning (OTASP) standard.

61. The server of claim 54, wherein server is configured with server-executable instructions to perform operations such that the server communicates with the mobile device communicates over the wireless communication network using a CDMA-based technology.

62. A communication system, comprising:
means for receiving an activation identifier linked to a particular home network and a second identifier is linked with a mobile device in a wireless communication network in response to an initiation of over-the-air activation of the mobile device with the wireless communication network, wherein the mobile device is one of a plurality of mobile devices registered to the particular home network, and wherein the plurality of mobile devices are provisioned with the activation identifier linked to the particular home network;
means for determining that the mobile device is a valid subscriber device based on the activation identifier and the second identifier; and
means for replacing the activation identifier with a different identifier linked to the mobile device during over-the-air activation, in response to determining that the mobile device is a valid subscriber device, wherein the over-the-air activation is performed using an Open Mobile Alliance —Device Management (OMA-DM) standard, and wherein the wireless communication network maintains a Cellular Intercarrier Billing Exchange Record (CIBER) corresponding to billing information for usage of the wireless communication network by the mobile device.

63. The communication system of claim 62, wherein when the wireless communication network is not the home network of the mobile device, the communication system further comprising:
means for determining the particular home network linked to the activation identifier; and
means for routing traffic between the mobile device and the particular home network via the wireless communication network to enable the particular home network to complete the over-the-air activation.

64. The communication system of claim 62, further comprising:
means for registering one or more activation identifiers linked to a particular home network with at least one roaming partner network.

65. The communication system of claim 62, further comprising means for registering the activation identifier linked to the particular home network with at least one roaming partner network.

66. The communication system of claim 65, wherein a first plurality of mobile devices is provisioned with a first activation identifier linked to the home network and
a second plurality of mobile devices is provisioned with a second activation identifier linked to the home network; and
wherein means for registering comprises:
means for registering the first activation identifier and the second activation identifier with at least one roaming partner network.

67. The communication system of claim 62, wherein the activation identifier linked to the home network comprises a mobile station identifier (MSID) value linked to the home network.

68. The communication system of claim 62, wherein means for receiving the activation identifier further includes means for receiving a mobile equipment identifier (MEID) value to the wireless communication network.

69. The communication system of claim 62, wherein the over-the-air activation is performed using the OMA-DM standard and Over-the-Air Service Provisioning (OTASP) standard.

70. The communication system of claim 62, wherein the mobile device communicates with the wireless communication network using a CDMA-based technology.

71. A mobile device, comprising:
means for initiating over-the-air activation of the mobile device with a wireless communication network, including means for forwarding an activation identifier linked to a particular home network over-the-air and a second identifier linked to the mobile device to the wireless communication network, wherein the mobile device is one of a plurality of mobile devices registered to the particular home network, and wherein the plurality of mobile devices are provisioned with the activation identifier linked to the particular home network; and
means for completing over-the-air activation of the mobile device with a service provider of the particular home network, including means for replacing the activation identifier with a different identifier linked to the mobile device, wherein the over-the-air activation is completed in response to determining that the mobile device is a valid subscriber device based on the activation identifier and the second identifier, and wherein the over-the-air activation is performed using an Open Mobile Alliance —Device Management (OMA-DM)

standard, and wherein the wireless communication network maintains a Cellular Intercarrier Billing Exchange Record (CIBER) corresponding to billing information for usage of the wireless communication network by the mobile device.

72. The mobile device of claim 71, wherein the wireless communication network is not the home network of the mobile device.

73. The mobile device of claim 71, wherein the activation identifier linked to the home network comprises a mobile station identifier (MSID) value linked to the home network.

74. The mobile device of claim 71, wherein the second identifier comprises a mobile equipment identifier (MEID) value linked to the mobile device.

75. The mobile device of claim 71, wherein over-the-air activation is performed using the OMA-DM standard and Over-the-Air Service Provisioning (OTASP) standard.

76. The mobile device of claim 71, further comprising means for communicating with the wireless communication network using a CDMA-based technology.

77. A server, comprising:
means for registering one or more activation identifiers linked to a particular home network with at least one roaming partner network;
means for receiving a request to activate a particular mobile device from a roaming partner network and a second identifier linked to the particular mobile device; and
means for replacing an activation identifier with a different identifier linked to the particular mobile device during over-the-air activation of the particular mobile device, wherein over-the-air activation is completed in response to detemiining that the mobile device is a valid subscriber device based on the activation identifier and the second identifier, wherein the mobile device is one of a plurality of mobile devices registered to the particular home network, and wherein the plurality of mobile devices are provisioned with the activation identifier linked to the particular home network, and wherein the over-the-air activation is performed using an Open Mobile Alliance —Device Management (OMA-DM) standard, and wherein the roaming partner network maintains a Cellular Intercarrier Billing Exchange Record (CIBER) corresponding to billing information for usage of the roaming partner network by the mobile device.

78. The server of claim 77,
wherein the particular mobile device is provisioned with the activation identifier linked to the particular home network prior to receiving the request to activate the particular mobile device.

79. The server of claim 77, further comprising:
means for performing over-the-air activation of the particular mobile device via the roaming partner network.

80. The server of claim 77, further comprising means for registering the activation identifier linked to the particular home network with at least one roaming partner network.

81. The server of claim 80, wherein a first plurality of mobile devices is provisioned with a first activation identifier linked to the home network and
a second plurality of mobile devices is provisioned with a second activation identifier linked to the home network; and
wherein the means for registering further comprises:
means for registering the first activation identifier and the second activation identifier with at least one roaming partner network.

82. The server of claim 77, wherein the activation identifier linked to the home network comprises a mobile station identifier (MSID) value linked to the home network.

83. The server of claim 77, wherein the second identifier comprises a mobile equipment identifier (MEID) value linked to the particular mobile device.

84. The server of claim 77, wherein the over-the-air activation is performed using the OMA-DM standard and Over-the-Air Service Provisioning (OTASP) standard.

85. A server, comprising:
means for receiving a request to initiate over-the-air activation of a mobile device in a wireless communication network, the request including an activation identifier linked to a particular home network, wherein the mobile device is one of a plurality of mobile devices registered to the particular home network, and wherein the plurality of mobile devices are provisioned with the activation identifier linked to the particular home network;
means for determining the particular home network linked to the activation identifier; and
means for routing traffic between the mobile device and the particular home network to complete over-the-air activation of the mobile device, wherein the means for routing traffic between the mobile device and the particular home network includes forwarding a second identifier linked to the mobile device to the particular home network, and wherein the over-the-air activation is completed in response to determining that the mobile device is a valid subscriber device based on the activation identifier and the second identifier, and wherein the over-the-air activation is performed using an Open Mobile Alliance —Device Management (OMA-DM) standard, and wherein the wireless communication network maintains a Cellular Intercarrier Billing Exchange Record (CIBER) corresponding to billing information for usage of the wireless communication network by the mobile device.

86. The server of claim 85, wherein the over-the-air activation of the mobile device includes replacing the activation identifier with a unique identifier linked to the mobile device.

87. The server of claim 85, further comprising:
means for registering the activated mobile device as a valid roaming device.

88. The server of claim 85, further comprising:
means for receiving data registering the activation identifier as being linked to the particular home network prior to receiving the request to initiate over-the-air activation.

89. The server of claim 85, wherein the second identifier comprises a mobile equipment identifier (MEID) value linked to the mobile device.

90. The server of claim 85, wherein the activation identifier linked to the home network comprises a mobile station identifier (MSID) value linked to the home network.

91. The server of claim 85, wherein the over-the-air activation is performed using the OMA-DM standard and Over-the-Air Service Provisioning (OTASP) standard.

92. The server of claim 85, further comprising means for communicating with the mobile device over the wireless communication network using a CDMA-based technology.

93. A non-transitory computer-readable storage medium having stored thereon processor-executable instructions configured to cause a processor of a mobile device to perform operations, comprising:

initiating over-the-air activation of the mobile device with a wireless communication network, including forwarding an activation identifier linked to a particular home network and a second identifier linked to the mobile device to the wireless communication network, wherein the mobile device is one of a plurality of mobile devices registered to the particular home network, and wherein the plurality of mobile devices are provisioned with the activation identifier linked to the particular home network; and completing over-the-air activation of the mobile device with a service provider of the particular home network, including replacing the activation identifier with a different identifier linked to the mobile device, wherein the over-the-air activation is completed in response to determining that the mobile device is a valid subscriber device based on the activation identifier and the second identifier, and wherein the over-the-air activation is performed using an Open Mobile Alliance —Device Management (OMA-DM) standard, and wherein the wireless communication network maintains a Cellular Intercarrier Billing Exchange Record (CIBER) corresponding to billing information for usage of the wireless communication network by the mobile device.

94. The non-transitory computer-readable storage medium of claim 93, wherein the processor-executable instructions are configured to cause the processor of the mobile device to perform operations such that the wireless communication network is not the home network of the mobile device.

95. The non-transitory computer-readable storage medium of claim 93, wherein the processor-executable instructions are configured to cause the processor of the mobile device to perform operations such that the activation identifier linked to the home network comprises a mobile station identifier (MSID) value linked to the home network.

96. The non-transitory computer-readable storage medium of claim 93, wherein the processor-executable instructions are configured to cause the processor of the mobile device to perform operations such that the second identifier comprises a mobile equipment identifier (MEID) value linked to the mobile device.

97. The non-transitory computer-readable storage medium of claim 93, wherein the processor-executable instructions are configured to cause the processor of the mobile device to perform operations such that the over-the-air activation is performed using the OMA-DM standard and Over-the-Air Service Provisioning (OTASP) standard.

98. The non-transitory computer-readable storage medium of claim 93, wherein the processor-executable instructions are configured to cause the processor of the mobile device to perform operations such that the mobile device communicates with the wireless communication network using a CDMA-based technology.

99. A non-transitory computer-readable storage medium having stored thereon processor-executable instructions configured to cause a processor of a server to perform operations, comprising:

registering one or more activation identifiers linked to a particular home network with at least one roaming partner network;

receiving a request to activate a particular mobile device from a roaming partner networks over-the-air and a second identifier linked to the particular mobile device; and replacing an activation identifier with a different identifier linked to the particular mobile device during over-the-air activation of the particular mobile device, wherein over-the-air activation is completed in response to determining that the mobile device is a valid subscriber device based on the activation identifier and the second identifier, where the mobile device is one of a plurality of mobile devices registered to the particular home network, and wherein the plurality of mobile devices are provisioned with the activation identifier linked to the particular home network, and wherein the over-the-air activation is performed using an Open Mobile Alliance —Device Management (OMA-DM) standard, and wherein the roaming partner network maintains a Cellular Intercarrier Billing Exchange Record (CIBER) corresponding to billing information for usage of the roaming partner network by the mobile device.

100. The non-transitory computer-readable storage medium of claim 99, wherein the particular mobile device is provisioned with the activation identifier linked to the particular home network prior to receiving the request to activate the particular mobile device.

101. The non-transitory computer-readable storage medium of claim 99, wherein the processor-executable instructions are configured to cause the processor of the server to perform operations further comprising:

performing over-the-air activation of the particular mobile device via the roaming partner network.

102. The non-transitory computer-readable storage medium of claim 99, further comprising registering the activation identifier linked to the particular home network with at least one roaming partner network.

103. The non-transitory computer-readable storage medium of claim 102, wherein a first plurality of mobile devices is provisioned with a first activation identifier linked to the home network; and a second plurality of mobile devices is provisioned with a second activation identifier linked to the home network; and registering the activation identifier further comprises:

registering the first activation identifier and the second activation identifier with at least one roaming partner network.

104. The non-transitory computer-readable storage medium of claim 99, wherein the processor-executable instructions are configured to cause the processor of the server to perform operations such that the activation identifier linked to the home network comprises a mobile station identifier (MSID) value linked to the home network.

105. The non-transitory computer-readable storage medium of claim 99, wherein the processor-executable instructions are configured to cause the processor of the server to perform operations such that the second identifier comprises a mobile equipment identifier (MEID) value linked to the particular mobile device.

106. The non-transitory computer-readable storage medium of claim 99, wherein the processor-executable instructions are configured to cause the processor of the server to perform operations such that the over-the-air activation is performed using the OMA-DM standard and Over-the-Air Service Provisioning (OTASP) standard.

107. A non-transitory computer-readable storage medium having stored thereon processor-executable instructions configured to cause a processor of a server to perform operations, comprising:

receiving a request to initiate over-the-air activation of a mobile device in a wireless communication network, the request including an activation identifier linked to a particular home network, wherein the mobile device is one of a plurality of mobile devices registered to the particular home network, and wherein the plurality of mobile devices are provisioned with the activation identifier linked to the particular home network;

determining the particular home network linked to the activation identifier; and routing traffic between the mobile device and the particular home network to complete over-the-air activation of the mobile device, wherein routing traffic between the mobile device and the particular home network includes forwarding a second identifier linked to the mobile device to the particular home network, and wherein the over-the-air activation is completed in response to determining that the mobile device is a valid subscriber device based on the activation identifier and the second identifier, and wherein the over-the-air activation is performed using an Open Mobile Alliance —Device Management (OMA-DM) standard, and wherein the wireless communication network maintains a Cellular Intercarrier Billing Exchange Record (CIBER) corresponding to billing information for usage of the wireless communication network by the mobile device.

108. The non-transitory computer-readable storage medium of claim 107, wherein the processor-executable instructions are configured to cause the processor of the server to perform operations such that the over-the-air activation of the mobile device includes replacing the activation identifier with a unique identifier linked to the mobile device.

109. The non-transitory computer-readable storage medium of claim 107, wherein the processor-executable instructions are configured to cause the processor of the server to perform operations further comprising:

registering the activated mobile device as a valid roaming device.

110. The non-transitory computer-readable storage medium of claim 107, wherein the processor-executable instructions are configured to cause the processor of the server to perform operations further comprising:

receiving data registering the activation identifier as being linked to the particular home network prior to receiving the request to initiate over-the-air activation.

111. The non-transitory computer-readable storage medium of claim 107, wherein the processor-executable instructions are configured to cause the processor of the server to perform operations such that the second identifier comprises a mobile equipment identifier (MEID) value linked to the mobile device.

112. The non-transitory computer-readable storage medium of claim 107, wherein the processor-executable instructions are configured to cause the processor of the server to perform operations such that the activation identifier linked to the home network comprises a mobile station identifier (MSID) value linked to the home network.

113. The non-transitory computer-readable storage medium of claim 107, wherein the processor-executable instructions are configured to cause the processor of the server to perform operations such that the over-the-air activation is performed using the OMA-DM standard and Over-the-Air Service Provisioning (OTASP) standard.

114. The non-transitory computer-readable storage medium of claim 107, wherein the processor-executable instructions are configured to cause the processor of the server to perform operations such that the server communicates with the mobile device over the wireless communication network using a CDMA-based technology.

* * * * *